Jan. 3, 1939.    A. R. RIDDERSTROM    2,142,332
TAPE APPLYING MACHINE
Filed Jan. 6, 1937    6 Sheets-Sheet 1

Inventor
ANDREW R. RIDDERSTROM
by Kenway & Witter
Attorneys

Jan. 3, 1939.　　A. R. RIDDERSTROM　　2,142,332
TAPE APPLYING MACHINE
Filed Jan. 6, 1937　　6 Sheets-Sheet 6

Inventor
ANDREW R. RIDDERSTROM
by Kenway & Witter
Attorneys

Patented Jan. 3, 1939

2,142,332

UNITED STATES PATENT OFFICE 2,142,332

TAPE APPLYING MACHINE

Andrew R. Ridderstrom, Nahant, Mass., assignor to Prime Manufacturing Company, Lynn, Mass., a corporation of Massachusetts Application January 6, 1937, Serial No. 119,243

20 Claims. (Cl. 12—20)

This invention relates to a machine for applying tape adhesively to sole pieces and the like. It consists more particularly in a machine for applying a stitch-receiving rib to an insole and forming the rib by employing adhesive tape bridging over a filler or core and secured adhesively to the insole on opposite sides of the core. Such an insole is disclosed in Patent No. 1,998,125 granted April 16, 1935, to F. F. Eno. In my prior Patent No. 1,794,204, I have disclosed a machine for applying reinforcing tape adhesively to leather and the like, and, in one aspect, the present invention is a further development of that machine particularly with a view to adapting it for the purpose above stated.

My improved machine embodies mechanism for feeding core stock and adhesive tape into the desired combined relationship, conducting the combined stock to a sole piece, such as an insole blank, and pressing the tape into adhesive contact therewith at opposite sides of the core, all simultaneously with the feeding movement of the sole piece. The production of a machine for performing these operations comprises one object of my invention.

An important feature of my invention relates to the severing of the stock adjacent to its junction with the sole piece when the tape applying operation has been completed. The combined core and tape being tough and heavy, I preferably employ both gripping and severing means for first gripping the stock in the portion to be severed and then severing the same while it is held by the gripping means. The gripping and severing means may, if desired, be manually operated from a single unitary source. The production of a novel mechanism for performing these functions comprises a further object of the invention.

Another feature of my invention relates to novel mechanism providing a tape guide, a core stock guide and means cooperating with the guides for placing the core stock within a transversely looped portion of the tape and longitudinally disposed thereof whereby producing combined core and tape stock which is thereupon conducted to the sole piece. This mechanism preferably employs one or more feeding rolls at the junction of the guides and has channels therein for receiving and supporting the core stock while it is being placed in proper position within the tape.

Among other novel features of the invention is a pivotally mounted support for carrying a work supporting roll and a work guiding gauge. A handle carried by this support is adapted to control the position of the gauge and also the position of the support about its pivot, and means including a spring and toggle links are provided for holding the support in working or non-working positions. The provision of mechanism of this nature for conveniently manipulating the work support and gauge comprises a further object of the invention.

These and other features of the invention will be best understood and appreciated from the following description of a preferred embodiment thereof, presented for purposes of illustration and shown in the accompanying drawings in which.

Proceeding now to a more specific description of the machine illustrated in the drawings, 10 indicates a pedestal within the overhanging top portion of which is mounted a shaft 12 arranged to be driven from a pulley 14. The pulley 14 is normally out of driving contact with a pulley 15 connected by a belt 16 to a pulley 17 on the shaft 12. The pulley 14 is brought into driving contact with the pulley 15 by depressing a foot treadle 18 connected by a link 20 to a bell crank 22.

Figures 6, 7, 8, 9, 10:
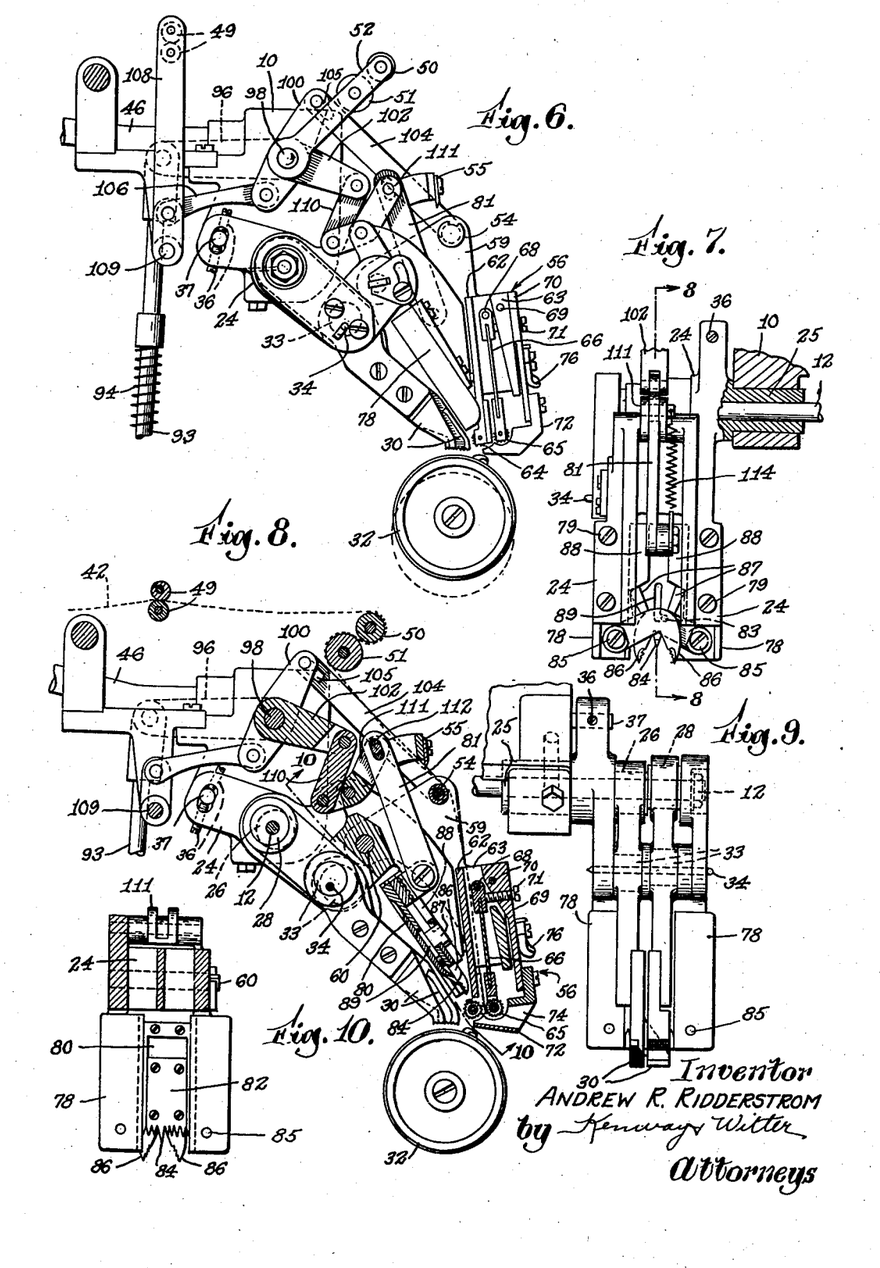
Fig. 6 is a view in side elevation of a portion of the machine on a larger scale.
Fig. 7 is a fragmentary view in front elevation thereof with the rib-gripping jaws in retracted and open position.
Fig. 8 is a sectional view taken on line 8—8 of Fig. 7.
Fig. 9 is a bottom plan view of the strip feeding and pressing elements.
Fig. 10 is a bottom plan view of the severing knife, taken on line 10—10 of Fig. 8.
Figures 11, 12, 13, 14, 15:
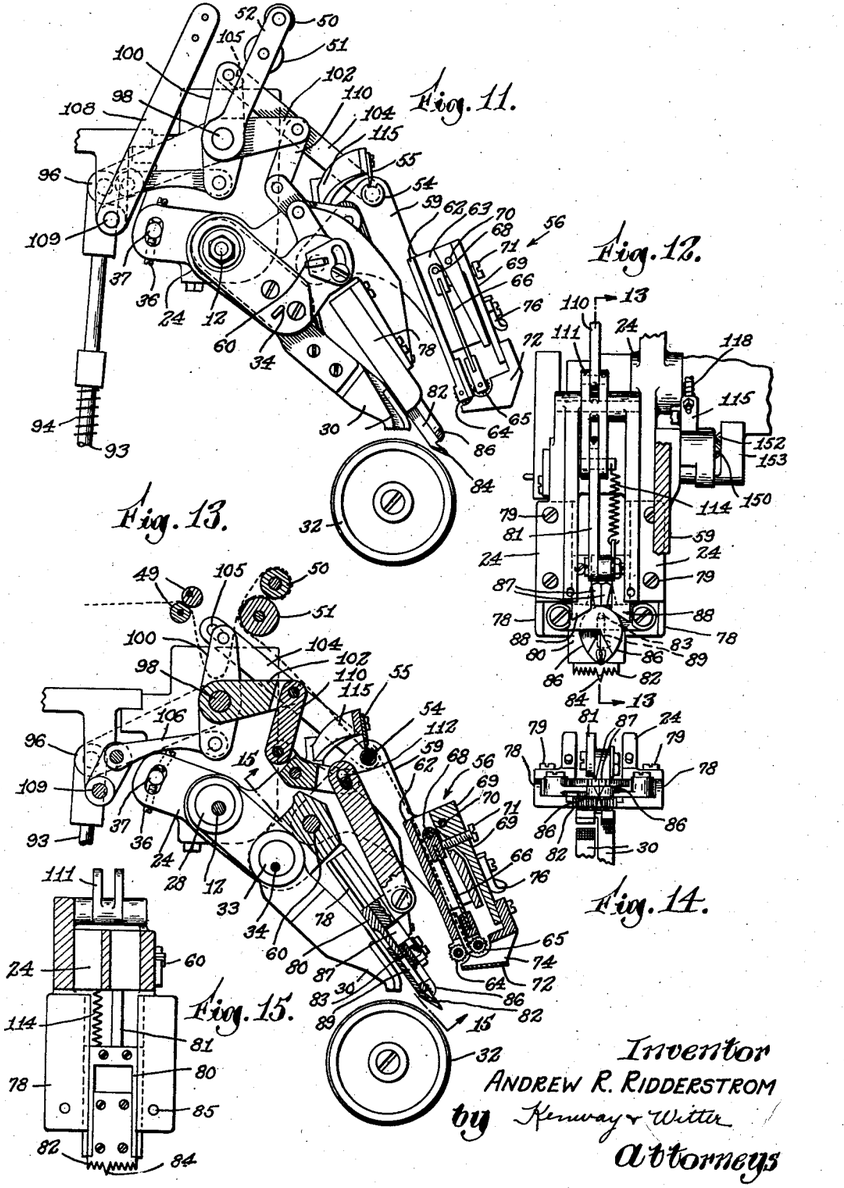
Fig. 11 is a view similar to Fig. 6 but showing the parts in the tape severing position.
Fig. 12 is a view similar to Fig. 7, but showing the parts in the tape gripping and severing position.
Fig. 13 is a sectional view taken on line 13—13 of Fig. 12.
Fig. 14 is a fragmentary bottom plan view of Figs. 11 and 12.
Fig. 15 is a view similar to Fig. 10, but showing the rib severing knife in projected position, this view being taken on line 15—15 of Fig. 13.

The mechanism now to be described, and including the tape feeding and pressing fingers 30 operated by the shaft 12, is supported on a bracket 24 carried by a cylindrical shank 25 integral with and supported within the overhanging top portion of the pedestal 10 as shown in Fig. 7. The shaft 12 extends through the shank 25 and has fixed thereto two eccentrics 26 and 28 fitting within and adapted to operate the tape feeding and pressing fingers 30. These fingers extend forwardly and downwardly to a point adjacent to a work supporting roll 32 and are respectively supported on and by two eccentrics 33 loose on a pin 34 carried in the bracket 24. The driven eccentrics 26 and 28, in conjunction with the loose eccentrics 33, are adapted to move the fingers alternately in a tape feeding and pressing motion hereinafter more specifically described. The feeding fingers and their operating mechanism are illustrated and described in detail in my Patent No. 1,794,204. The bracket 24 is adjustable about the axis of the shank 25 by means of two adjusting screws 36 carried in the upper end of the bracket and engageable with a fixed pin 37 (Fig. 11) projecting outwardly from the pedestal 10.

Figure 23:
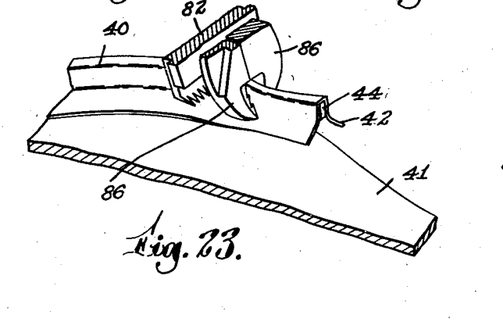
Fig. 23 is a fragmentary view illustrating the strip gripping operation.
Figure 24:
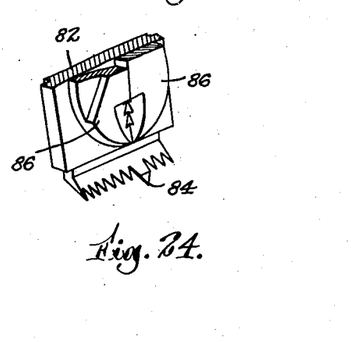
Fig. 24 is a fragmentary perspective view of the strip gripping and severing means in the extreme forward position.
Figure 25:
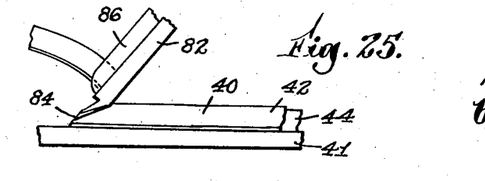
Fig. 25 is a view in side elevation thereof, shown in engagement with the strip.

The function of the machine comprising my invention is to apply a stitch-receiving rib 40 to an insole 41 through the use of adhesive tape 42 bridging over a core 44 and secured adhesively to the insole on opposite sides of the core (Fig. 23), an insole constructed in this manner being shown in Patent No. 1,998,125. The tape 42 is supplied to the machine from a reel 45 suitably supported on a bracket 46 and the core stock 44 is supplied from a reel 48. The tape is fed from the reel 45 forwardly through two rolls 49, one of which is eccentrically mounted, around two rolls 50 and 51 mounted on an arm 52, over a roll 54 and beneath a tape engaging element 55 adapted to cooperate with the roll to grip the tape therebetween, and from thence to and through a tape guiding mechanism indicated at 56. The mechanism 56 is secured by screws 58 to a bracket 59 mounted for pivotal movement on a shaft 60 carried by the bracket 24.

Figures 19, 20, 21, 22:
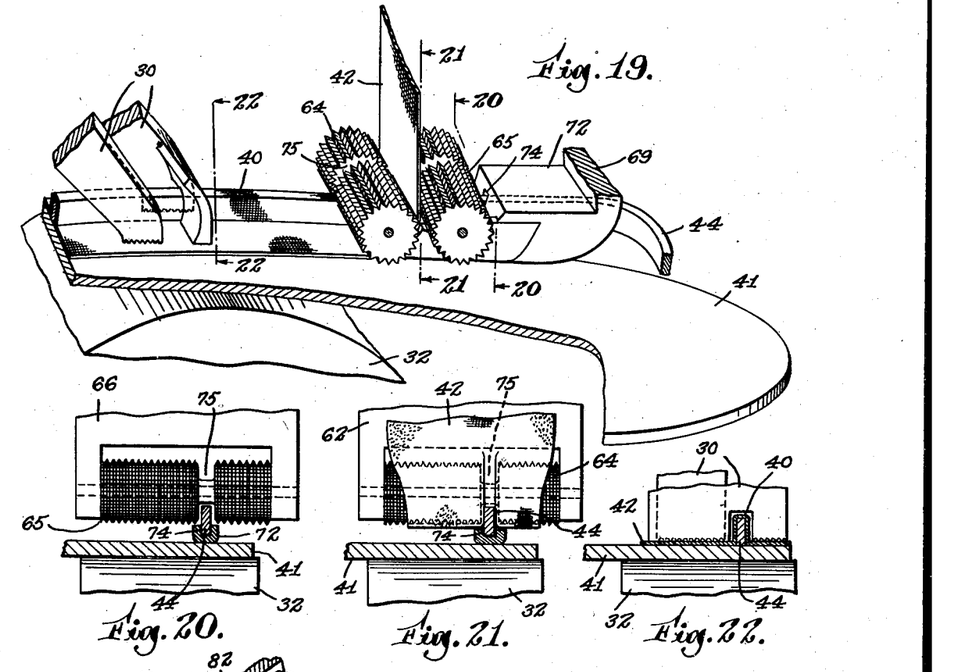
Fig. 19 is an enlarged fragmentary view showing the rib applying operation.
Figs. 20, 21 and 22 are detail views taken respectively on the corresponding lines indicated in Fig. 19.

The mechanism 56 embodies a bottom wall 62 and a combined side and top wall 63, a knurled tape engaging roller 64 being mounted in the forward end of the bottom wall 62. A like and cooperating roller 65 is carried on the forward end of a resilient element 66 pivoted at 68 to the side wall. The core presenting mechanism includes a top member 69 which is pivoted to the top wall at 70 and carries a set screw 71 adapted to engage and depress the element 66 when the member 69 is in its lowermost position. The member 69 carries at its free end an element 72 having a core stock guiding channel 74 extending therethrough and open to the rollers 64 and 65, these rollers being recessed therearound at 75 (Figs. 19 and 20) in alignment with the channel 74 whereby to receive the core stock as it passes through the channel. A pivoted latch 76 is adapted to hold the several elements of the mechanism 56 in closed position, releasing of this latch permitting the elements to be swung apart for the purpose of threading the tape and core stock therethrough.

Two plates 78 secured to the bracket 24 by screws 79 provide a slideway therebetween and between the feeding fingers 30 and the mechanism 56, and a slide 80 is mounted for forward and rearward movement therein under the action of a link 81 connected thereto. A knife 82 secured to the forward end of the slide has its forward cutting edge serrated and provided with a relatively long and pointed cutting tooth 84 in alignment with the core receiving channel 74. Pivoted to the plates 78 at 85 are two elements having two forwardly projecting jaws 86 and two rearwardly projecting ears 87. Two spaced bars 88 carried by the slide have their forward end faces bevelled inwardly-rearwardly whereby upon forward movement of the slide these faces engage the ears and pivot the jaws together while the jaw elements are being moved forwardly. The long tooth 84 of the severing knife is in alignment with the opening between the jaws and the arrangement is such that upon forward movement of the slide 80 the jaws engage and grip the rib portion of the work and the knife continues its forward movement and severs the work as it is held gripped by the jaws. The tooth 84 serves to steady the work by engagement with the core thereof during the severing operation, the ears 87 passing into the trough between the bars 88 during this operation. The jaws are drawn rearwardly with the slide 80 by means of a pin 83 carried by the lower jaw and extending into a slot 89 in the slide.

The relative positions of the various parts above described are controlled from the following mechanism operated from a foot treadle 90 fixed to a shaft 91 carrying an arm 92 having its free end connected to a rod 93, a spring 94 normally acting to hold the rod and treadle in raised position against a stop screw 95. The upper end of the rod is connected to the free end of an arm 96 fixed to a shaft 98 mounted in the overhanging top portion of the pedestal 10. The shaft 98 projects outwardly from the end of the overhanging portion of the pedestal and has three arms 100, 102 and 52 mounted thereon. The upper end of the arm 100 is connected by a link 104 to the bracket 59, this connection including a lost motion slot 105 within the link for a purpose hereinafter described. The lower end of the arm 100 is connected by a link 106 to an arm 108 pivoted to the pedestal at 109 and carrying the tape feeding rolls 49 on its free end.

The free end of the arm 102 is connected by a link 110 to one arm of a bell-crank 111 having its other arm connected to the link 81. This connection includes a lost motion slot 112 within the link and a spring 114 connects the pins at opposite ends of the link, whereby permitting the bell-crank a rearward motion beyond that permitted by rearward movement of the link 81 and the slide 80 to which it is connected. The tape engaging element 55 is mounted on the free end of the laterally projecting portion of an arm 115 mounted on the shaft 60 and normally pressed against a stop 116 by a spring 118.

The work supporting roll 32 is carried on the free end of a bracket 120 extending through and outwardly from the pedestal and pivotally mounted on the pedestal at 122. A rod 123 connected to the bracket and extending upwardly therefrom through a stud 124 projecting outwardly from the pedestal is provided with a spring 125 normally holding the bracket upwardly in engagement with an adjustable stop screw 126. A handle 128 carried by and projecting forwardly from the bracket is adapted to move the bracket downwardly against the action of the spring, and toggle links 130 pivoted together and to the bracket and pedestal are adapted to hold the bracket in the downward position against the action of the spring when the stop shoulders 132 are in engagement.

A work gauge 134 cooperating with the work supporting roll 32 is slidably mounted within a bracket support 135 and is connected by a link 137 to the handle 128. The handle is connected to the bracket 120 through a vertical pivot 140 about which the handle can be moved horizontally to effect movement of the gauge transversely of the roll 32. The position of the gauge is indicated by a finger 141 on the handle and cooperating with the index 143 on the bracket, the gauge and handle being normally held in a predetermined intermediate position by opposed springs 145.

The operation of the machine may be briefly described as follows: The core 40 and tape 42 are threaded through the machine substantially as illustrated in dash line in Fig. 8. The work supporting roll 32 is moved to the depressed position and held in such position by the toggle links 130. The insole 41 is then placed on the roll in contact with the gauge 134 and the combined core and tape are placed in contact with the insole. The handle 128 is then raised whereupon the toggle is broken and the work is brought by the roll into contact with the feeding and pressing surfaces of the fingers 30. The operator then depresses the treadle 18 whereupon the shaft 12 is driven and fingers 30 operated alternately to feed the combined tape and core forwardly with the insole and press the tape into contact with the insole at opposite sides of the core. The forward finger (Fig. 19) is bifurcated to straddle the core and the tape engaging surface of one of the furcations is serrated whereby to grip the tape and feed it forwardly, it being understood that both furcations operate to press the tape into firm contact with the sole piece. The purpose of the rear finger is to grip the tape while the forward finger is raised and moved forwardly for a new grip on the tape. During such movement the position of the insole laterally of the tape may be varied by moving the handle 128 horizontally, the position of the rib 40 relative to the marginal edge of the insole being thereby under the control of the operator.

It will be apparent that the fingers 30 draw the tape downwardly through the tape guiding mechanism 56 and that the tape is combined with the core stock 40 at the channels 74 and 75, the channel 74 bringing the core into edge contact with the tape and the channels 74 and 75 feeding the combined core and tape in proper position during the pressing operation of the fingers. The feeding and pressing operation is continued until a desired length of the rib 40 has been applied to the insole. The operator thereupon releases the treadle 18 thereby stopping the operation of the fingers 30. He then depresses the treadle 90 whereupon the following operations are effected.

Figures 1, 2:
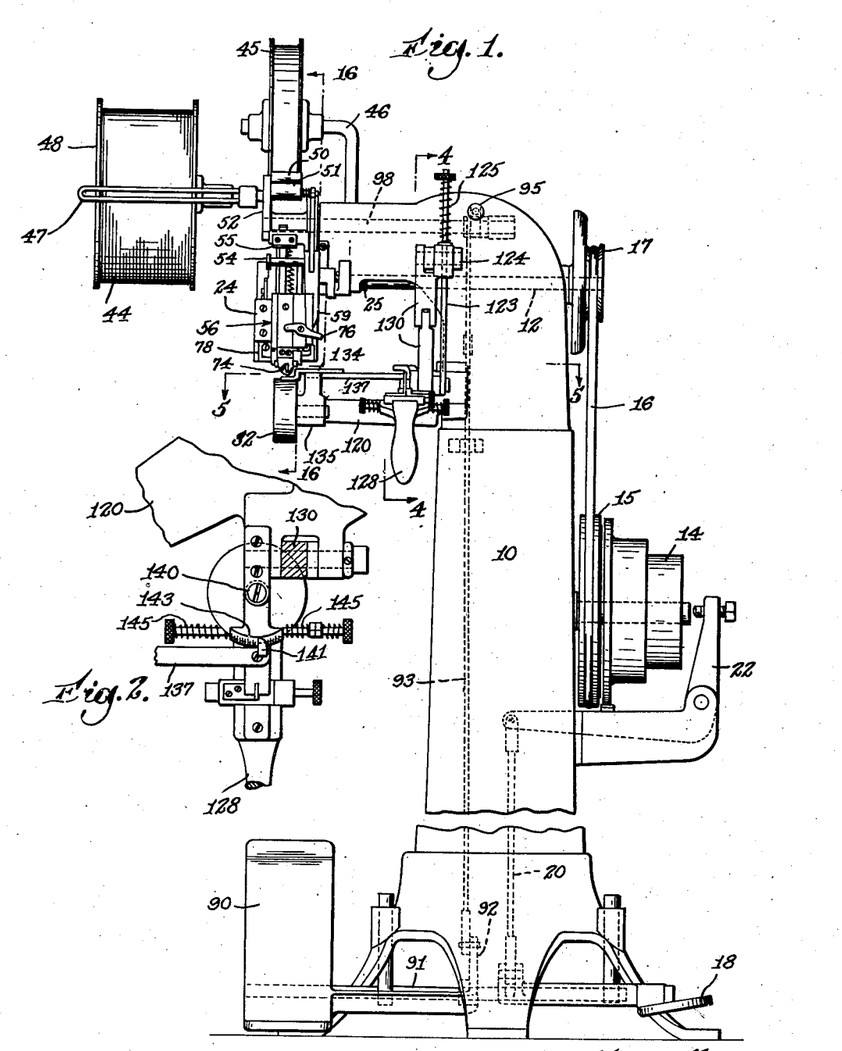
Fig. 1 is a view in front elevation of a machine embodying my invention.
Fig. 2 is a fragmentary plan view showing a portion of Fig. 5 on a larger scale.
Figures 3, 4, 5:
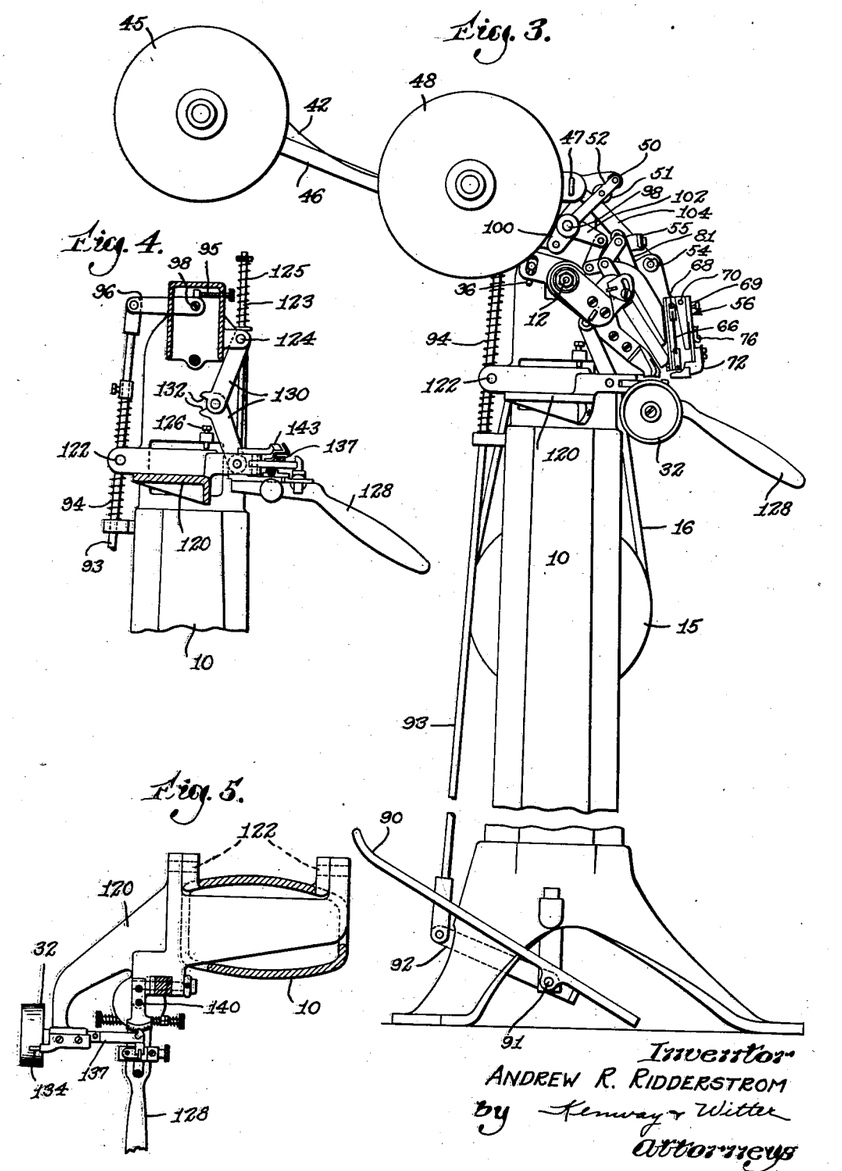
Fig. 3 is a view in side elevation of the machine.
Fig. 4 is a fragmentary sectional view taken on line 4—4 of Fig. 1.
Fig. 5 is a plan sectional view taken on line 5—5 of Fig. 1.
Figures 16, 17, 18:
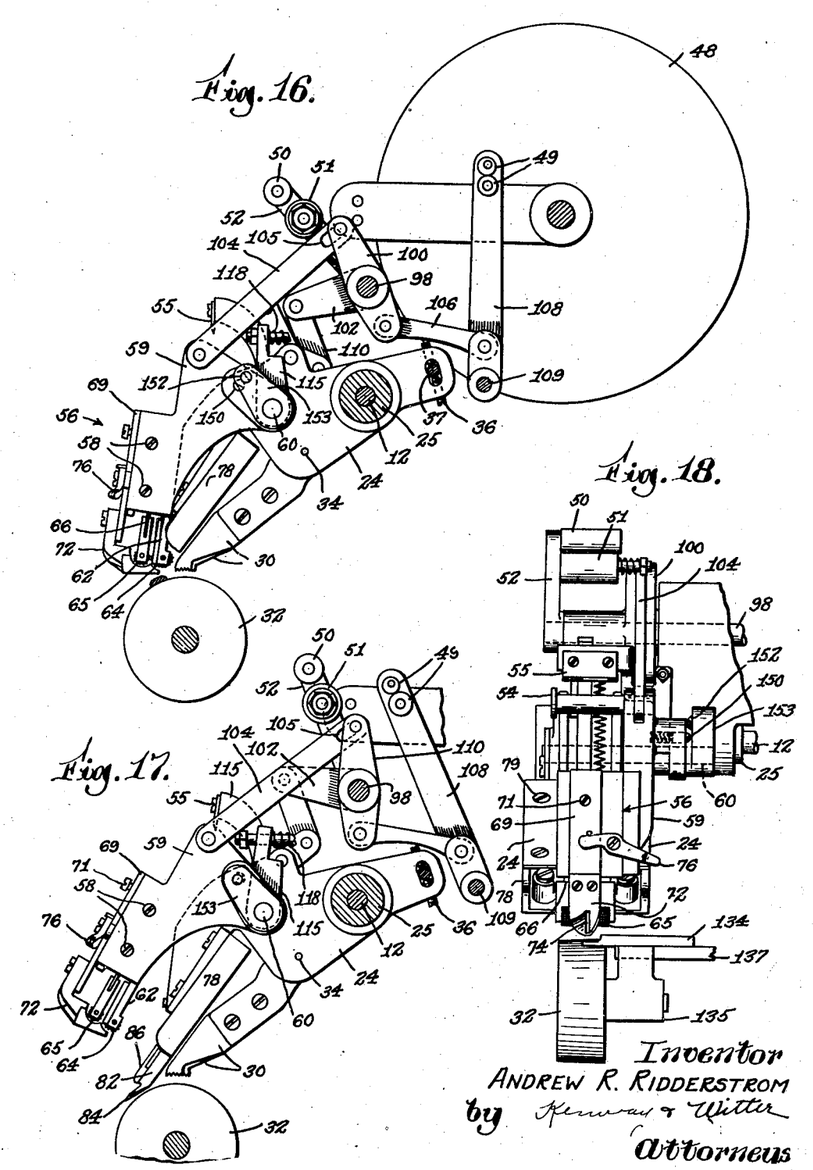
Fig. 16 is a view in elevation taken on the line 16—16 of Fig. 1 and corresponding to the parts in the position of Fig. 6.
Fig. 17 is a like view showing the parts in the rib severing position.
Fig. 18 is a view in front elevation of Fig. 17.

The depressing of the treadle 90 rocks the shaft 98 counterclockwise (Figs. 3 and 4) and simultaneously therewith rocks the arms 100, 102 and 52. The arm 100 through the link 104 thereupon rocks the bracket 59 rearwardly (Figs. 11 and 17) whereby raising the mechanism 56 and drawing the combined core and tape to a taut condition. During this movement the roll 54 is raised to a position contacting the element 55 whereby the tape is held in taut condition between the element 55 and the roll 54 and the tape is prevented from retrograde movement. Simultaneously with such movement of the mechanism the arm 102, through the bell-crank 111, moves the slide 80 forwardly. The jaws 86 move forwardly therewith and grip the rib 40, and continued forward movement of the slide causes the knife 82 to sever the combined core and tape while it is held gripped by the jaws. The relatively long and pointed tooth 84 of the knife aids considerably in this operation by first penetrating and partially severing the core.

Also simultaneously with the above-described tape severing operation, the arm 100 through the link 106 pivots the arm 108 forwardly whereupon the rolls 49 grip and feed a portion of the tape from the reel 45, the tape riding freely through the rolls upon rearward movement of the arm 108. The rolls 50—51 act in conjunction with the rolls 49 to receive the portion of tape fed by the latter and carry the same in looped conditions forwardly, the arm 52 moving rearwardly while the arm 108 moves forwardly.

It will be noted that in their full forward position the jaws 86 and the knife 82 are at the location normally occupied by the free end of the tape feeding mechanism 56, and it is therefore desirable that this mechanism should be returned to normal position only after the jaws and knife have been returned. A delay in the return of the mechanism 56 to its normal position is for this purpose effected through the following means acting in conjunction with the lost motion slot 105 in the link 104. A spring pressed detent 150 (Fig. 18) carried by the bracket 59 cooperates with a fixed detent 152 carried on an arm 153 fixed to the shaft 60. During rearward movement of the bracket 59 by means of the link 104 the detent 150 rides over and snaps into position behind the detent 152 whereby holding the bracket 59 and the mechanism 56 in raised position. During the first portion of the return movement the jaws 86 and knife 82 are substantially returned. Thus the pin thereupon engages the other end of the slot (Fig. 13) and causes return of the bracket 59 and mechanism 56 to normal position only after the jaws and knife have moved rearwardly from the location normally occupied by this mechanism.

Having thus described my invention what I claim as new and desire to secure by Letters Patent of the United States is:

1. A rib-applying machine comprising in combination, means for supporting a sole piece for feeding movement, means for directing a core onto said piece during feeding movement, means for feeding an adhesive tape longitudinally onto and about the core and prior to its contact with the sole piece, means for pressing the two edge portions of the tape into adhesive contact with the sole piece at opposite sides of the core, all simultaneously with said feeding movement.

2. A rib-applying machine comprising in combination, means for supporting a sole piece for feeding movement, means for directing a core onto said piece during feeding movement, means for feeding an adhesive tape onto and along the core and pressing the tape into adhesive contact with the sole piece at opposite sides of the core, all simultaneously with said feeding movement, and means for gripping the combined core and tape and severing the same at a point adjacent to its junction with the sole piece while it is so gripped.

3. A rib-applying machine comprising in combination, means for supporting a sole piece for feeding movement, means for directing a core onto said piece during feeding movement, means for feeding an adhesive tape onto and along the core and pressing the tape into adhesive contact with the sole piece at opposite sides of the core, all simultaneously with said feeding movement, means for gripping the combined core and tape and severing the same at a point adjacent its junction with the sole piece while it is so gripped, and unitary means operated from a single source for causing the gripping and severing means to function.

4. A rib-applying machine comprising in combination, means for supporting a sole piece for feeding movement, means for directing a core onto said piece during feeding movement, means for feeding an adhesive tape onto and along the core and pressing the tape into adhesive contact with the sole piece at opposite sides of the core, all simultaneously with said feeding movement, means for placing the combined core and tape under tension adjacent its junction with the sole piece, means for gripping and severing the same while under such tension, and means operated from a single source for causing the operation of both last-named means.

5. A rib-applying machine comprising in combination, means for supporting a sole piece for feeding movement, means for conducting a combined core and tape to said piece during such movement, means for pressing the tape into adhesive contact with the sole piece at opposite sides of the core, and means for severing the combined core and tape adjacent to its junction with the sole piece.

6. A rib-applying machine comprising in combination, means for supporting a sole piece for feeding movement, means for feeding core stock toward the first-named means, means for feeding adhesive tape onto the core and folding it transversely about three sides of the core, and independent means for pressing the two edge portions of the tape into adhesive contact with the sole piece on opposite sides of the core.

7. A rib-applying machine comprising in combination, means for supporting a sole piece for feeding movement, means for directing a core onto said piece during such movement, and means for feeding an adhesive tape onto and along the core, the last named means including a bifurcated finger for engaging and pressing the tape into adhesive contact with the sole piece at opposite sides of the core, all simultaneously with said feeding movement.

8. A rib-applying machine comprising in combination, a work supporting roll, means for directing a core onto a sole piece during movement thereof on the roll, means for feeding an adhesive tape onto and along the core, the last named means including a pair of fingers for engaging and pressing the tape into adhesive contact with the sole piece at opposite sides of the core, and means for operating the fingers alternately.

9. In a core and tape feeding mechanism, means providing a tape guiding channel, a tape guiding roll at the exit end of the channel, the roll having an annular channel therein intermediate of the roll ends, and core presenting means located adjacent to the annular channel and having a core guiding passage open to and registering with the annular channel.

10. A machine having the combination defined in claim 9, wherein the core guiding passage extends transversely across the first named channel.

11. In a core and tape feeding mechanism, means providing a tape guiding channel, cooperating rolls at the exit end of the channel for engaging the tape therebetween, registering annular channels being provided in the rolls between the ends thereof, and core presenting means located adjacent to the annular channels and having a core guiding passage open to and registering with the annular channels.

12. Mechanism having the combination defined in claim 11, plus resilient means supporting one of said rolls, and means supporting the core guiding means and acting in its closed position on the resilient means to hold said one roll resiliently pressed toward the other roll and being adjustable to open position wherein the core guiding passage is located remotely from the rolls.

13. In a core and tape feeding mechanism, a bottom plate having a tape guiding member at its forward end, a rotary member cooperating with the guiding member to engage a tape therebetween, and core presenting means mounted for pivotal movement and having an open core guiding channel remote from the pivotal axis of said means, the channel being adjacent to and opening onto said members when the means is in closed position and the members being recessed in alignment with the channel whereby permitting the passage of a core to and along with the feeding of the tape.

14. In a machine of the class described, a support, a pair of cooperating jaws carried by the support, a knife adjacent to the jaws, and means for moving the jaws forwardly into opposed gripping engagement with opposite sides of a work piece and for moving the knife relative to the jaws to sever the work held thereby.

15. In a machine of the class described, a support, a pair of jaws carried by the support, a slide in the support, cooperating surfaces between the slide and jaws for moving the jaws into gripping engagement with a work piece upon forward movement of the slide, and a knife carried by the slide for severing the work piece while it is held by and between the jaws.

16. In a machine of the class described, a support, a pair of elements pivotally carried by the support, and having forwardly projecting jaws and rearwardly projecting ears, a slide having faces thereon cooperating with said ears and adapted upon forward movement of the slide to pivot the elements forwardly and close the jaws into gripping engagement with a work piece, and a knife carried by the slide between the pivots of the elements and movable with the slide to sever the work held by the jaws.

17. In a machine of the class described, a support, a slide on the support, a knife on the forward end of the slide, a pair of jaws carried by the support adjacent to the knife, means for moving the jaws forwardly and into engagement with a work piece upon forward movement of the slide, and means for moving the slide forwardly to grip the work and thereafter continue forward movement of the slide and knife relative to the jaws to sever the work held by the jaws.

18. A machine including the combination defined in claim 17, wherein the forward cutting edge of the knife is serrated and is provided with a relatively long and pointed tooth in registration with the work held between the closed jaws.

19. In a machine of the class described, means for supporting an insole blank for feeding movement, means for conducting a tape to said insole during such movement, said conducting means having its delivery end adjacent to the support in one position and remote therefrom in another position, means for pressing the tape into adhesive contact with the insole, and means for severing the tape adjacent to its junction with the insole and for raising said conducting means to said another position and holding it in that position during the severing operating and return movement of the severing element.

20. In a machine of the class described, a pivotally mounted support, a spring normally holding the support in working position, a work-supporting roll on the support, a work gauge on the support cooperating with the roll, a handle carried by the support and connected to the gauge, the handle being adapted to move the gauge and to move the work support against the action of the spring, and toggle links for holding the work support in its non-working position against the action of the spring.

ANDREW R. RIDDERSTROM.